Sept. 10, 1940.    J. M. CERCOWNAY    2,214,575
AUTOMOBILE
Filed June 4, 1938    2 Sheets-Sheet 1

INVENTOR.
John M. Cercownay
BY Horace Barnes
ATTORNEY.

Sept. 10, 1940.     J. M. CERCOWNAY     2,214,575
AUTOMOBILE
Filed June 4, 1938     2 Sheets-Sheet 2
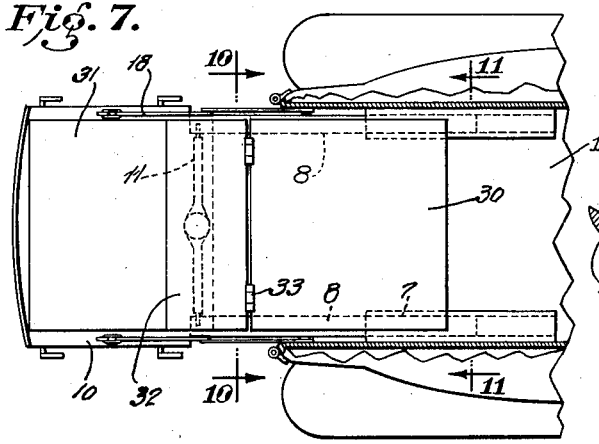
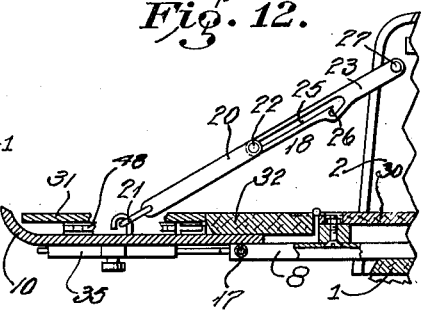
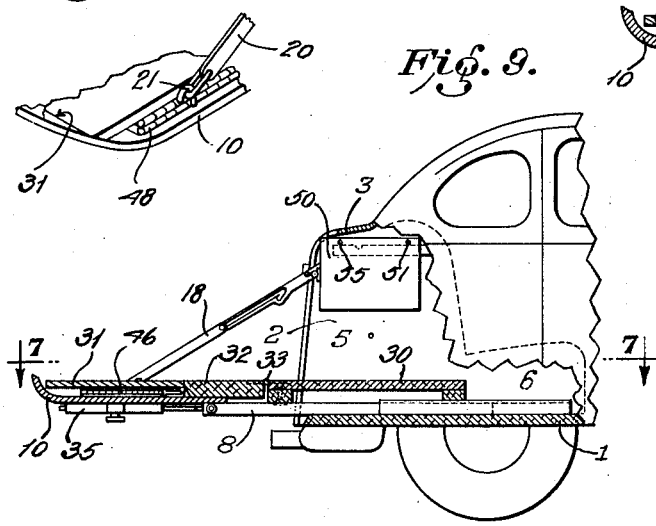
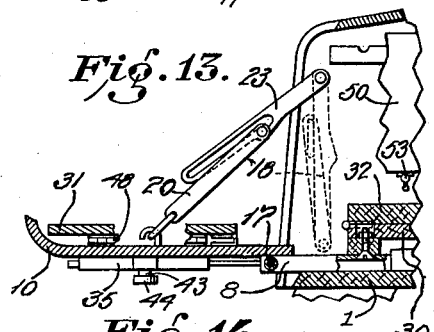
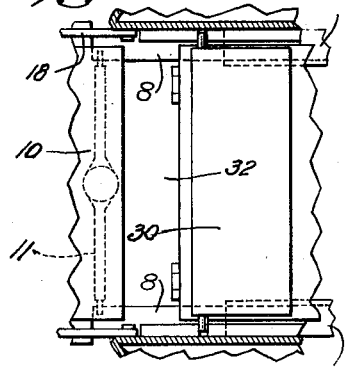
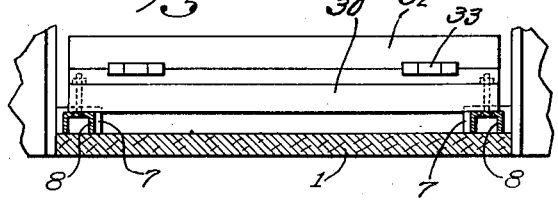
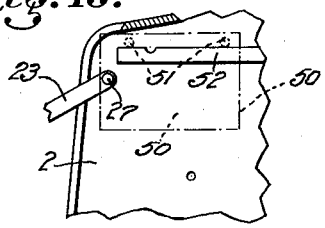
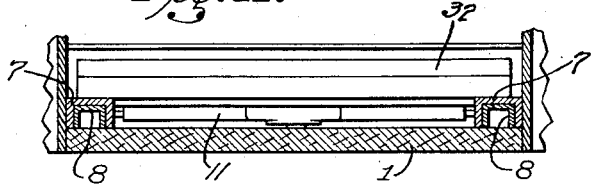
INVENTOR.
John M. Cercownay
BY Horace Barnes,
ATTORNEY.

Patented Sept. 10, 1940

2,214,575

UNITED STATES PATENT OFFICE 2,214,575

AUTOMOBILE

John M. Cercownay, Los Angeles, Calif.

Application June 4, 1938, Serial No. 211,871

11 Claims. (Cl. 296—26)

This invention relates to improvements in automobile bodies.

The principal object of my invention is to provide a car of closed construction, such as the sedan and coupe types, with facilities of relatively simple and of practicable construction for sleeping accommodations for two persons, for cooking and eating at other times, and for the carriage of a considerable amount of luggage, without change in the general arrangements or infringement upon the seating capacity of the interior of the car.

A further object of the invention is the provision of an automobile of the conventional closed type having a rear compartment openable through a rear door pivotally movable to swing rearwardly to a horizontal plane and in extension with relation to the body-floor of the car to support a bed, or selectively, to swing laterally to either side affording ready access to the rear compartment of the car.

A still further object of the invention is to provide a door for the rear compartment of a car swingable to either side having a foldable shelf hinged thereto to afford support for cooking conveniences and which are safeguarded from wind by sheltering wing-braces of novel arrangement and design.

Still further objects of my invention include an extensible bed-base retractible within the rear compartment of the car and supported in its extended position upon the lowered door; novel hinge devices to admit of said door being alternatively locked or swung to lateral and horizontal open positions; and a trunk of ample capacity mounted in the rear compartment and secured in lowered or raised positions as convenience demands.

Other objects and advantages residing in my invention, and objects relating to the various details of construction thereof and incidental to the carrying out of said objects, will be readily apparent in the detailed description of my invention to follow.

The accompanying drawings illustrate by way of example a representative form of my invention, in which:

Fig. 7 is a view in horizontal section taken through the rear end of the car showing the bed-portion thereof in plan and with the rear door extended, as taken on line 7—7 of Fig. 9.

Fig. 8 is a fragmentary detail view of the car door extended.

Fig. 9 is a view of the rear end of the car, partly in side elevation and partly in section, with the rear door lowered and the bed-elements extended.

Fig. 10 is a view in cross-section taken on line 10—10 of Fig. 7 but with the hinged extension of the bed-base in folded condition.

Fig. 11 is a similar view taken on line 11—11 of Fig. 7.

Fig. 12 is a detail view in section showing the rear door in its extended position.

Fig. 13 is a similar view showing the door retracted and in position to be swung upwardly to close the rear end of the car.

Fig. 14 is a fragmentary view in horizontal section of the rear end of the car.

Fig. 15 is a similar view in vertical section.

Figure 1:
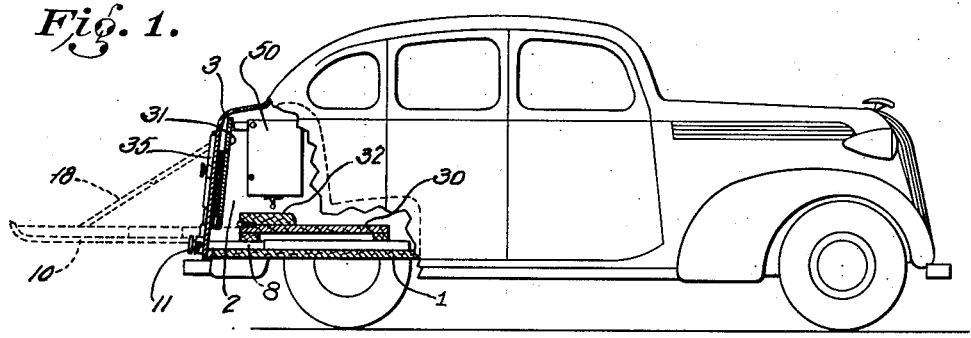
Figure 1 is a view in side elevation of an automobile broken away at its rear end to disclose an embodiment of my invention therein in closed condition and in broken lines showing the rear door extended.
Figure 2:
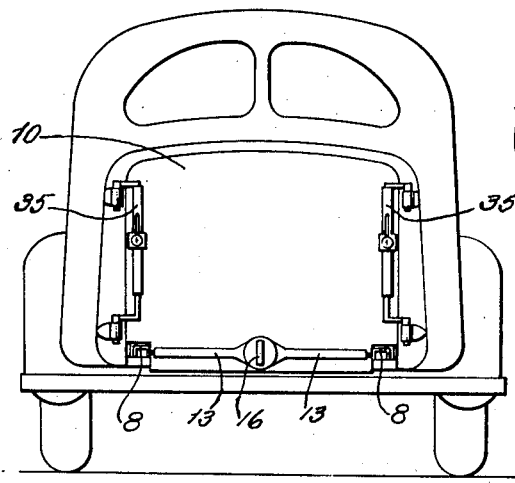
Fig. 2 is a view in rear elevation of the car with the rear door closed.

Referring to said views, the reference numeral 1 indicates the floor-base of the body of an automobile of the closed or sedan type, and 2 the side walls at the rear end thereof, the top of said body extending as at 3 rearwardly to enclose with said walls and base a roomy compartment 5 extending under the rear seat of the car at 6. Inverted channel-bars 7 are rigidly secured to said floor within said compartment 5, upon the lateral sides thereof and house within their channels smaller inverted channel-bars 8 for telescopic movement therein and which may be slidably extended longitudinally of the car while still supported in the channels 7, as seen in Figs. 9 and 12.

Figure 4:
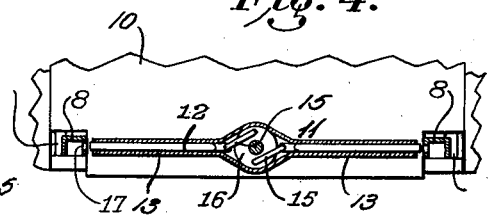
Fig. 4 is a partial view of the rear door showing the horizontal hinge devices in longitudinal section.
Figure 5:
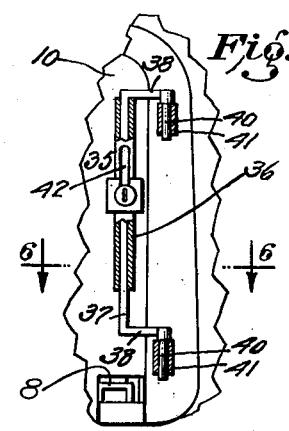
Fig. 5 is a similar view showing one of the vertical hinges in longitudinal section.
Figure 6:
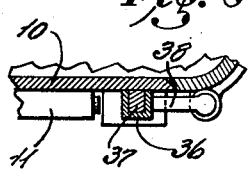
Fig. 6 is an enlarged view in cross-section taken on line 6—6 of Fig. 5.

A door 10 closing the rear, openable end of said compartment is hingedly connected to the projecting ends of said channel-bars 8 and is slidable outwardly therewith. Such hinge-connections, indicated generally by the numeral 11, are illustrated in Fig. 4 and comprise a pair of bolts 12 slidable and extending in line through a housing 13 and are connected by links 15 upon opposite sides of a rotatable plate 16. By means of a key or other suitable device the plate 16 may be actuated to advance said bolts in opposite directions to cause them to enter at their outer ends apertures 17 formed in the outer ends of the bars 8, or they may be similarly retracted therefrom, as shown in said view. When connected with said bars the bolts 12 serve as hinge-pintles to allow the door 10 to be swung outwardly.

The door 10 is secured in horizontal relation parallel to the floor 1 by folding braces 18 upon each side which are each formed in two parts, the lower part 20 being detachably connected at one end to the door, as at 21, and its other end by a pin 22 is slidably connected to the upper brace-part 23 within a longitudinal slot 25 formed with an offset notch 26 at its upper end. The brace-part 23 on each side of the door is pivotally connected at 27 to the respective sides 2 of the compartment 5. In the retracted position of the channel-bars 8 and when the door is in its lowered position where the same may serve as a table, as shown in Fig. 13, the brace-pins 22 are seated within the notches 26, and when said bars are extended as shown in Fig. 12 said pins bear upon the outer ends of the slots 25. When the door is closed the braces 18 will fold closely into the compartment sides, as shown in broken lines in Fig. 13.

A bed-base 30 is connected at its forward end and supported upon the channel-bars 8 and at its rear end is slidably movable upon the bars 7 so that when the bars 8 are moved outwardly the bed-base is similarly extended. To bridge the gap between the outer end of said bed-base and the folded shelf 31, carried by the door 10 and forming the outer end of the bed, to be more particularly described, an extension 32 is provided, hingedly connected to the bed-base at 33 and arranged to extend outwardly in the plane of the bed-base and to be folded back upon the bed-base, as shown in Fig. 13.

It will be seen that a level bed-support is provided with marked economy of means accommodating two persons and which will retain an inflatable air-mattress, seat-cushions, or any other suitable mattress to furnish a comfortable bed.

In addition to the provision of the bed as described the door 10 is so constructed and supported that it may be pivotally swung to either side to furnish a shelf-support for cooking conveniences or for any purpose. To this end readily detachable hinges 35 are provided upon either side of the door to be used selectively to swing the door in either direction laterally to provide a shelter from the wind according to the direction from which the latter blows. Said hinges each include a vertical housing 36 rigidly secured to a lateral edge of the door within which a bar 37 is slidably movable vertically as well as being pivoted therein. Said bar is formed with horizontally directed arms 38 at each end which terminate in vertically directed pintles 40 arranged to pivotally seat in barrels 41 mounted upon the exterior of the side walls 2.

The housing 36 is slotted at 42 through which a stem 43 extends terminating in a screw-stud 44 adapted to be clamped upon said housing to retain said bar rigidly at fixed positions within the housing and thus allow the door to be swung thereon or to lock the two sides of the door when the same is closed, for which a key is provided whereby said screw-stud may be actuated.

Figure 3:
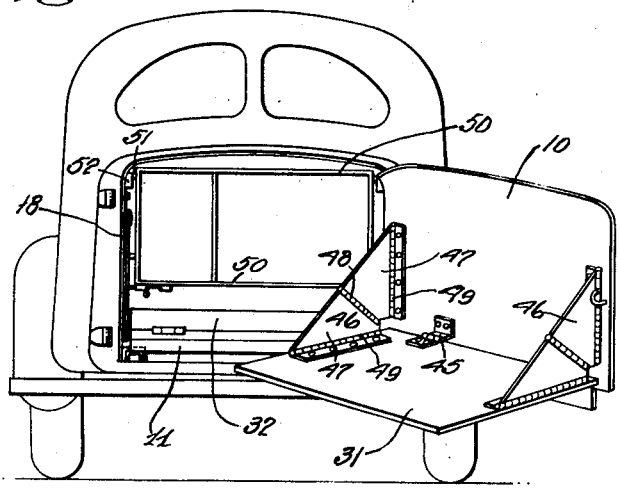
Fig. 3 is a similar view with said rear door in open condition and swung laterally and with its folding-shelf lowered.

When the door 10 is swung to one side or the other, as shown in Fig. 3, the folding-shelf 31 may be released and lowered upon its hinges 45 thus extending folding side-braces 46 composed of gore-pieces 47 hingedly connected together at 48 and similarly connected to the shelf and door, respectively, at 49. Said shelf thus serves as a table-top when in folded condition and the door is extended as shown in broken lines in Fig. 1, and as a support for a stove, not shown, and other cooking apparatus, or as a general work shelf when the door is swung to one side.

In the compartment 5 I have shown a trunk or box 50 for the storage of utensils, clothes or other impedimenta, which, when the door is closed is arranged to be supported by projecting studs 51 at its upper rear corners upon brackets 52 rigid with the side walls 2 and secured against dislodgement by slidable bolts 53 extending into said side walls. When the bed is to be used the trunk may be swung upwardly at its lower end and slidably moved rearwardly at its upper end to engage both the studs 51 and additional studs 55 upon said brackets, in the manner shown in Fig. 9.

While I have described and illustrated my invention with considerable particularity it will be understood that I do not wish to confine myself to the precise construction shown but that various changes and modifications thereof within the spirit of the invention and scope of the appended claims are contemplated as being within the limits of the protection sought by Letters Patent.

Having described my invention, what I claim is:

1. An automobile including a rear compartment, a single door for said compartment, hinge connections at opposite sides of said compartment to swing said door outwardly in either lateral direction, a shelf hingedly connected to the inner side of said door adapted to swing into horizontal relation therewith when the door is opened, and braces upon opposite sides supporting said shelf and formed of inwardly folding gores flexibly connected to said door and to said shelf and offering when in supporting relation to the shelf a barrier to wind blowing from lateral directions thereon.

2. An automobile having a rear compartment, a single door for said compartment, hinge-connections upon opposite sides of said door to swing the door in either lateral direction outwardly, hinge-connections at the bottom edge of the door to swing the door rearwardly in longitudinally axial relation to the car, and a shelf hingedly connected on said door arranged to serve as a table when said door is swung rearwardly and swingably extensible to form a shelf when the door is swung laterally.

3. In an automobile having a rear compartment, a pair of bars slidably mounted in said compartment to extend in horizontal directions therebeyond, a door for said compartment hingedly connected to said bars, and a bed-base connected to said bars and movable therewith to provide with said door a bed-support.

4. In an automobile having a rear compartment, a pair of bars slidably mounted in said compartment to extend in horizontal directions therebeyond, a door for said compartment hingedly connected to said bars, a bed-base supported on said bars and extensible therewith, and a folding extension on said bed-base projecting therefrom to provide a bed-support.

5. In an automobile having a rear compartment, a pair of bars slidably mounted in said compartment to extend in horizontal directions therebeyond, a door for said compartment hingedly connected to said bars, and a pair of folding braces supporting said door in its open condition and adjustable to the extended position of said door.

6. An automobile having a rear compartment, a bed-base in said compartment slidably extensible beyond said compartment, a door to said compartment hingedly connected to swing downwardly into horizontal relation and providing a further extension to said bed-base in substantially horizontal alignment therewith, and an extension hingedly connected to said bed-base arranged to extend outwardly therebeyond and over said door in substantially horizontal alignment with the upper surfaces of said bed-base and said bed-extension of said door.

7. In an automobile having a rear compartment, a door for said compartment, hinge connections to swing said door outwardly, a shelf hingedly connected to the inner side of said door and adapted to swing into horizontal relation therewith when the door is opened, and braces upon opposite sides supporting said shelf formed of inwardly folding gores flexibly connected to said door and to said shelf providing when in supporting relation to the shelf a protection from wind blowing from lateral directions thereon.

8. In an automobile having a rear compartment, a door for said compartment, hinge connections to swing said door outwardly, a shelf hingedly connected to the inner side of said door and adapted to swing into horizontal relation therewith when the door is opened, and braces upon opposite sides supporting said shelf formed of collapsible sheet material flexibly connected to said door and to said shelf providing when in supporting relation to the shelf a protection from wind blowing from lateral directions thereon.

9. An automobile having a rear compartment, a bed-base in said compartment, a door to said compartment hingedly connected to swing into horizontal relation, a shelf in folded condition secured to said door and providing a bed-support in substantially the same horizontal plane as said bed-base, and an extension hingedly connected to said bed-base and arranged to extend outwardly over said door and occupy the space between said bed-base and said shelf.

10. An automobile having a rear compartment, a bed-base in said compartment slidably extensible beyond said compartment, a door to said compartment hingedly connected to swing into horizontal relation, a shelf secured upon the inner side of said door and providing a bed-support in substantially the same horizontal plane as said bed-base, and an extension hingedly connected to said bed-base arranged to extend outwardly therebeyond and over said door.

11. An automobile having a rear compartment, a bed-base in said compartment slidably extensible outwardly beyond said compartment, a door to said compartment, hinge connections arranged to swing said door downwardly into horizontal relation, and a shelf upon the inner side of said door in folded condition providing a further extension to said bed-base in substantially horizontal alignment therewith.

JOHN M. CERCOWNAY.